INVENTOR.
BERRY W. FOSTER
ATTORNEY

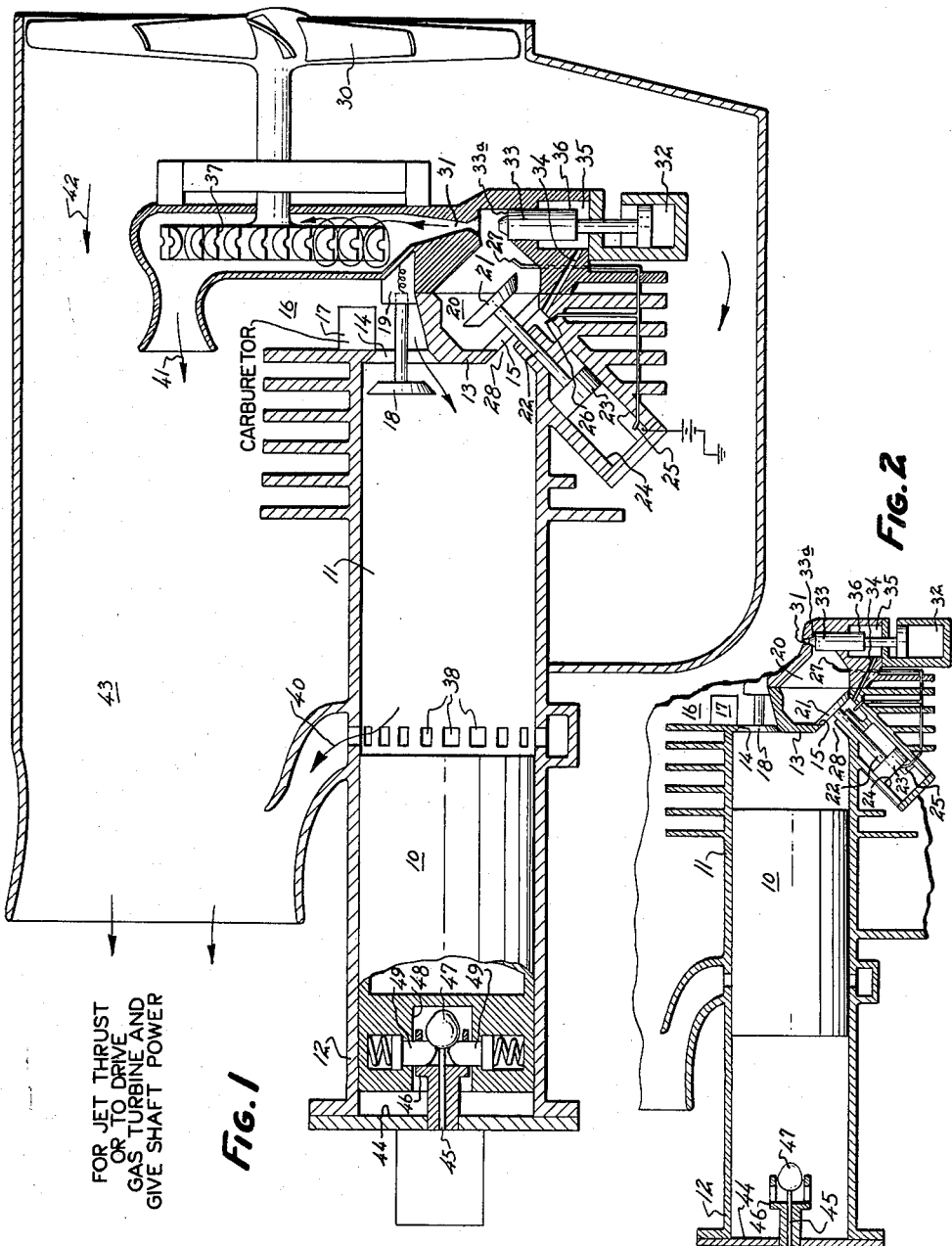

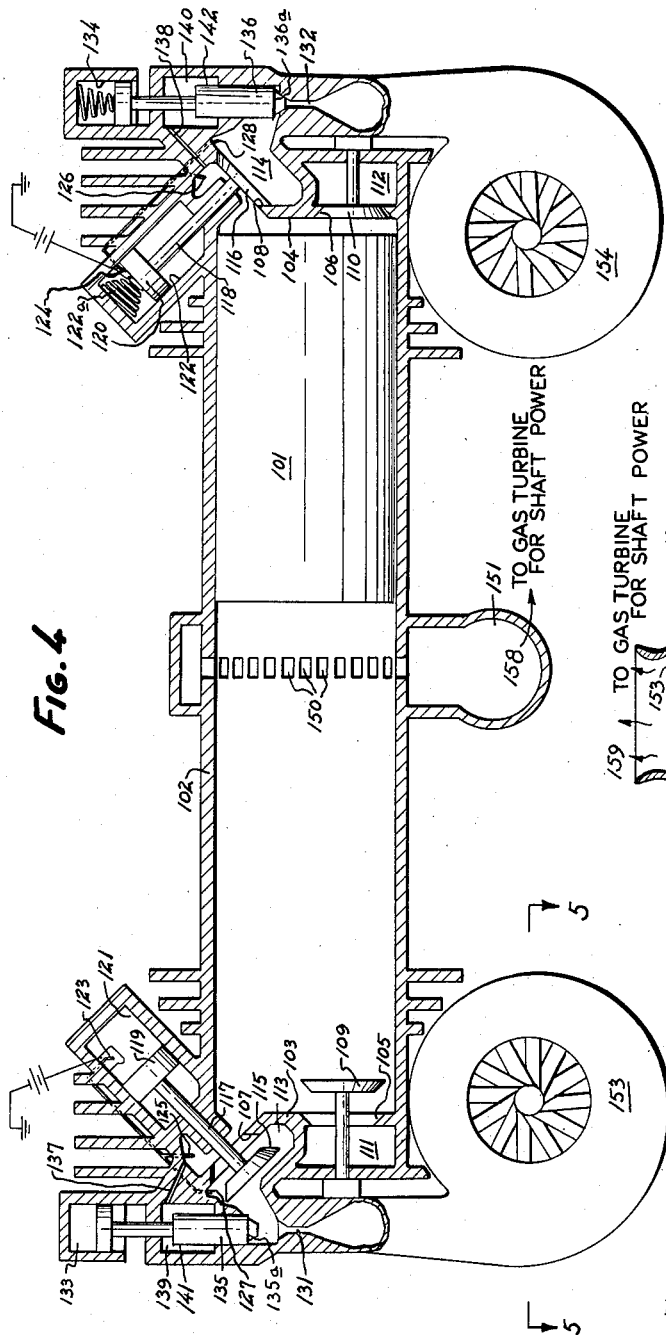
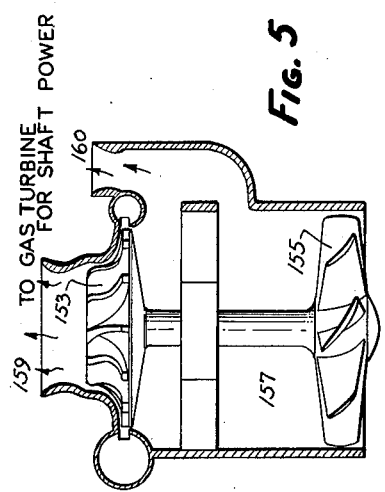

INVENTOR.
BERRY W. FOSTER

INVENTOR.
BERRY W. FOSTER
BY
ATTORNEY

INVENTOR.
BERRY W. FOSTER
BY
ATTORNEY

United States Patent Office 2,982,087
Patented May 2, 1961

2,982,087

INTEGRAL COMPRESSOR-ENGINE FREE-PISTON GAS GENERATORS

Berry W. Foster, 1147 10th St., Santa Monica, Calif.

Filed July 30, 1958, Ser. No. 752,032

24 Claims. (Cl. 60—13)

This invention relates to an improved compressor of the piston type and to a method of operating compressors of the piston type and to a method of operating compressors and associated mechanisms. This application is a continuation-in-part of applications Serial Nos. 666,149 and 701,609, filed, respectively, June 17, 1957 and December 9, 1957 and both now abandoned. Serial No. 666,169 was a continuation-in-part of application Serial No. 621,978, filed November 1, 1956, now abandoned, which was a division of application Serial No. 222,368, filed April 23, 1951, which issued as Patent No. 2,807,136.

A feature of these inventions, as explained in Patent No. 2,807,136, is the division of the gas compressed in the engine cylinder into two portions, which are isolated during the compression. The internal power that runs the compressor is obtained by burning fuel in the portion which is trapped in the engine cylinder after separation. The other portion represents the output of the compressor, and the compressed gas therein may be stored, expanded, or be fueled and exploded, according to the way the compressor is being used.

In one form of this invention, my novel piston compressor is combined with a gas turbine and a rotary compressor. In this case fuel is burned in both of the isolated portions of the compressed gas. The energy in the engine cylinder part operates the piston compressor while the energy in the jet combustion chamber part is used to drive a gas turbine, which propels a rotary compressor. The exhaust gases from the turbine, engine, and rotary compressor may be used separately as desired, or they may flow into a joint accumulator and then be exhausted through another gas turbine or any other power absorbing device.

Heretofore, all the gases which were compressed in the engine cylinder were heated and expanded in the engine cylinder. In the present invention only a portion of the total amount of gases compressed by the engine cylinder is left in communication with the engine cylinder during the heating and expansion process. The rest is isolated in a jet combustion chamber, heated there, and then expanded through a jet nozzle. The result is an important simplification of engine operation and greater efficiency in the use of its power. Also, the specific power per pound weight of engine may be increased to better than four.

Suppose that the volume of the chamber that is isolated outside the compressor cylinder is $a$, and that $b$ is the volume of the compressed gas isolated in the engine cylinder chamber at the moment of isolation and the addition of energy. Then, if the unit masses of the compressed gas in $a$ and $b$ are $m_1$ and $m_2$, respectively, the total mass M of the compressed gas will be: $M = am_1 + bm_2$. The energy in the mass $bm_2$ should be as near as possible to the exact amount which, when heat is added or fuel is exploded in it, a second mass M will be compressed to the same compression ratio at the opposite end of the cylinder by driving the piston back across the cylinder. At the opposite end of the cylinder the process may be repeated or a recoil air cylinder may be used so the process can be repeated at the same end of the cylinder. The output energy $am_1$ is available as external power, and the efficiency of the engine is at its peak when $am_1$ is large in comparison to $bm_2$.

The invention may also be used to supply a storage tank with compressed gas. Again, at each stroke (or each alternate stroke) a portion of the compressed gas is isolated, energy is added, and the resultant expansion of this portion of the gas drives the compressor piston, while the rest of the compressed gas is conducted into the storage tank. The energy in the gas that drives the piston is sufficient to move it toward the other end of the cylinder and compress a like amount there.

My novel compressor unit employs a free piston instead of a piston having a connecting rod and crankshaft, but the invention differs from other free-piston engines in several particulars, including the following: (1) During the compression stroke the air which is compressed in the engine cylinder is separated into two portions; a portion which remains in contact with the piston and an external power portion which is isolated from the piston before heat is added; consequently only a fraction of the total amount compressed in the engine cylinder is expanded in the compressed engine cylinder. (2) The external-power air performs no work on the piston. (3) The piston-compressor air does all the work on the piston by expanding the hot engine gases down to the supercharger pressure before opening the exhaust port, thus eliminating the blown-down pressure losses at the exhaust port. (4) The piston itself does no external work on a large compressor piston, which reciprocates in a separate compressor cylinder; all the compression work is done in the integral compressor-engine cylinder where the engine and compressor gases are compressed at the same time as a gaseous mixture, the heated gases which are expanded in the compressor engine may do some external work if that is desirable. Moreover, the invention includes a fluid-pressure means for operating a separating valve between the external-power air and the internal-power air. It also includes a fluid-pressure means for operating the nozzle exhaust valve for the external-power air.

In one form of the invention, my novel free piston compressed gas generator, compounded with a gas turbine, drives a rotary compressor. The discharge air from this rotary compressor may be used to air-cool the engine, and part of it may be used to supercharge and scavenge the engine cylinder. The exhaust gases from the compressor turbine, engine, and rotary compressor may be used separately as desired, or they may flow into a joint accumulator and then be exhausted through another gas turbine or any other power absorbing device.

In all modifications of the invention, the compressor piston preferably does no external work and supplies none of the external power, acting only: (1) to compress the gases, and (2) in some instances to precompress the intake air to a small pressure ratio for scavenging the burnt gases. All or practically all the external power is supplied by the separate portion of the air which is isolated from the compressor cylinder.

Other objects and advantages of the invention can be better understood from the following description of an embodiment thereof illustrated in the accompanying drawings. However, it is to be understood that the drawings and description are illustrative only and are not definitive of the invention, the scope of which is stated in the appended claims.

In the drawings:

Fig. 1 is a diagrammatic view in elevation and in section of one form of a combination embodying the principles of this invention, comprising a free-piston compressed-gas generator combined with a re-entry gas turbine (which uses the exhaust gases from the piston jet chamber and powers a large-mass-flow, low-pressure-ratio, rotary, axial-flow compressor), this form of the invention employing an engine with a two stroke, single-acting, compressed-gas generator. The free piston is shown in its starting position.

Fig. 2 is a similar view on a reduced scale of the cylinder portion of the device of Fig. 1, with the free piston shown at the opposite end during operation.

Fig. 3 is a diagrammatic view in elevation and in section of another form of the invention, wherein a free-piston compressed-gas generator is combined with a centripetal gas turbine which uses the exhaust gases from the piston jet chamber and powers a large mass flow compressor. This form of the invention includes an engine with a two-stroke, double acting compressed gas generator. The free piston is shown at the left side of the cylinder, with fuel being exploded in the engine and jet chambers.

Fig. 4 is a view similar to Fig. 3 showing the free piston moving toward the right side of the cylinder.

Fig. 5 is a view in side elevation and in section taken along the line 5—5 in Fig. 4 showing the turbine and compressor.

Figure 3:
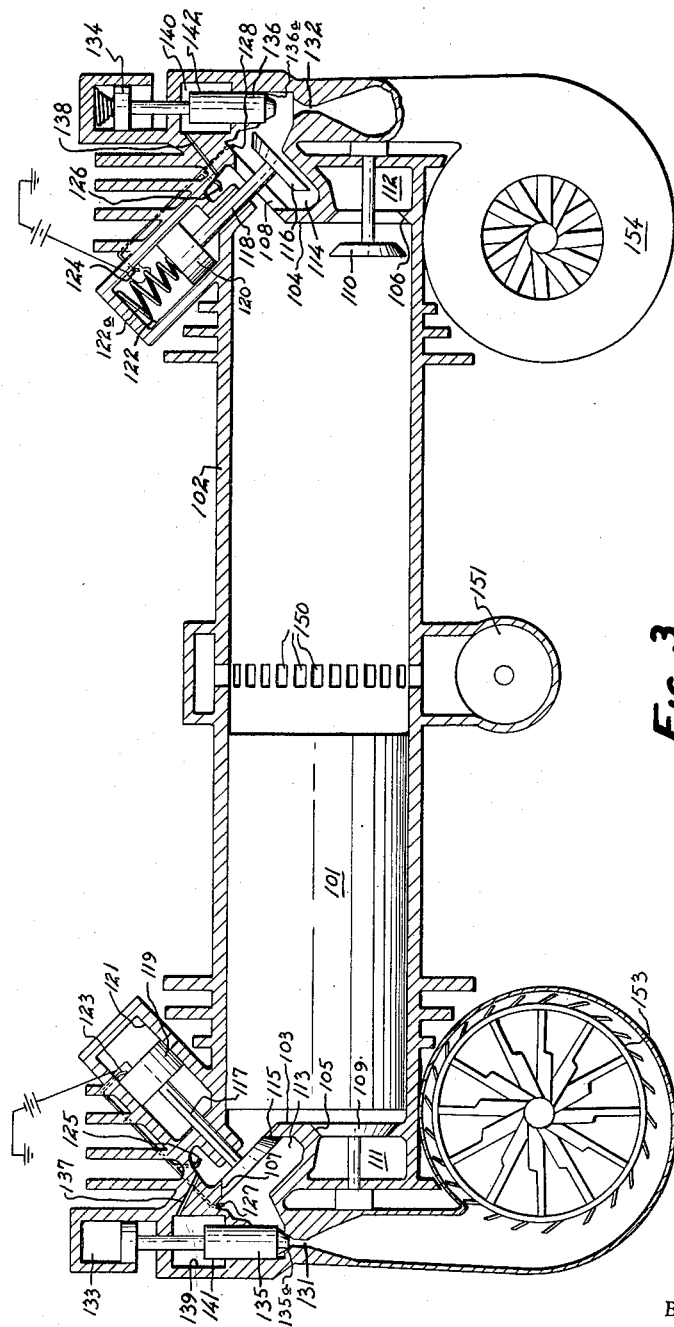

*A single acting free-piston engine with a recoil spring (Figs. 1 and 2)*

A two-stroke single-acting compressed-gas generator with a recoil spring and in combination with a gas turbine and a rotary compressor, is illustrated in Figs. 1 and 2.

A piston 10 reciprocates in and between an engine cylinder 11 and a recoil cylinder 12, which may, as shown, be integral. An engine head 13 at the right end of the engine cylinder 11 is provided with an intake port 14 and a separating port 15. The intake port 14 leads from a duct 16 for supercharged air and a carburetor 17 into the engine cylinder 11. An intake check valve 18 seats in and closes the intake port 14 when the pressure in the cylinder 11 is equal to or greater than the pressure of the supercharged air in the duct 16, being biased by a spring in 19, which may be a fluid spring or a mechanical spring.

The separating port 15, when open, connects the engine cylinder 11 to a jet combustion chamber 20. A separating valve 21 is operated by fluid pressure means to open and close the separating port 15. The valve 21 is connected by a stem 22 to a fluid pressure piston 23, which slides in a pneumatic cylinder 24. The fluid pressure in the cylinder 24 holds the valve 21 open until the pressure in the main cylinder 11 and the jet chamber 20 acts on the valve 21 with sufficient force to close it.

When the valve 21 is forced closed, the piston 23 contacts a switch 25 which discharges sparks at spark plugs 26 and 27, respectively, in an engine combustion chamber area 28 of the cylinder 11 and in the jet combustion chamber 20. Fuel may be injected in a well-known manner simultaneously with this spark ignition, or, as illustrated, a supercharger 30 and carburetor 17 may be used.

Leading from the jet combustion chamber 20 is an exhaust port or jet nozzle 31. A fluid spring 32 (or a helical mechanical spring as in Fig. 3) forces a valve 33 to close the nozzle port 31 when the pressure in the jet chamber 20 is at a low value. A bleed passage 34 leads from the engine cylinder 11 to a gas pressure cylinder 35. When the intake gas is compressed in the main cylinder 11, pressure is built up in the cylinder 35, and this pressure acts on a piston 36 to help keep the valve 33 closed until the explosion in the jet chamber 20 increases the pressure on a shoulder $33^a$ enough to open the nozzle valve 33.

Figure 11:
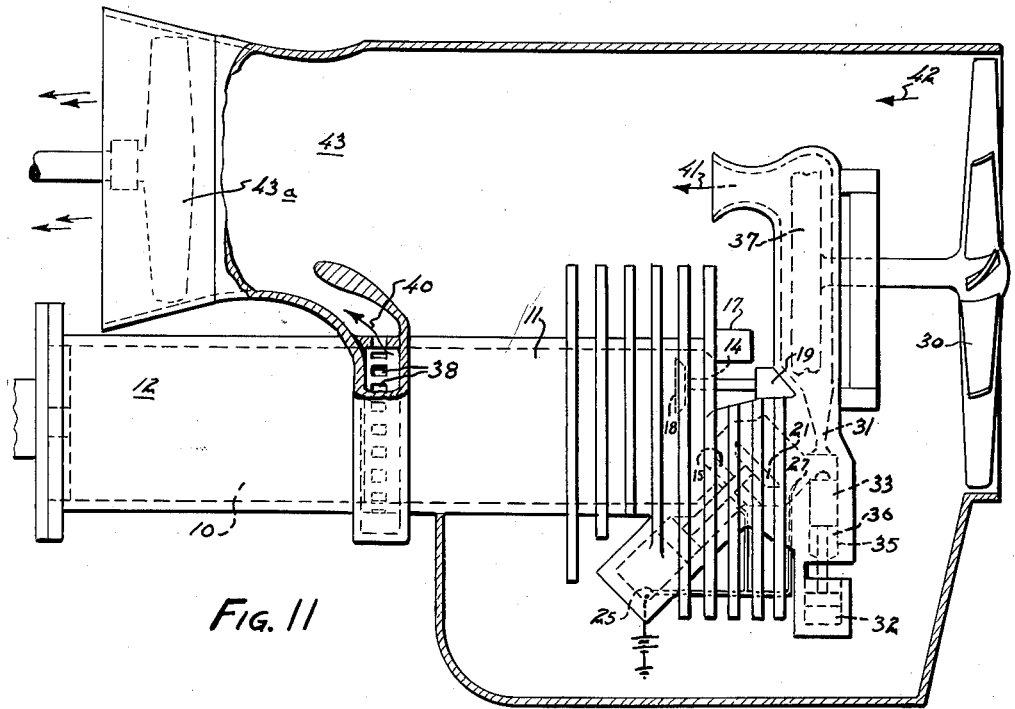
Fig. 11 is a view in elevation and partly in section of a device like that of Fig. 1 showing connection thereto to a gas turbine.

The high velocity gases from the jet nozzle 31 are preferably directed into a re-entry gas turbine 37 or into a centripetal or impulse turbine. The energy of the jet nozzle gases drives the turbine 37, which, in the example herein, powers a low-pressure-ratio high-mass-flow rotary compressor 30. The compressor 30 discharges compressed air into the duct 16, part of the compressed air being used to supercharge the engine cylinder 11 through the carburetor 17 and the intake port 14. The burnt gases are exhausted through exhaust sleeve ports 38 when the piston 10 uncovers them. The exhaust gases from the engine (indicated by the arrow 40), the exhaust gases from the turbine 37 (indicated by the arrow 41), and the cooling air from the compressor 30 (arrow 42) may be mixed in a joint accumulator 43 and used as desired. For example, these gases may be expanded through a low-pressure turbine 43a (Fig. 11) to give shaft power or they may be used directly as jet thrust.

The recoil cylinder 12 at the left end of the engine stores the kinetic energy of the piston 10 and gives it back so that the compression process can be repeated on the right end. The head 44 on the left end of the cylinder 12 houses a centrally located starting device comprising a starting mechanism proper 45, latch hold 46, and a latch release 47, all rigidly mounted to the head 44. Extending radially into an axial centrally recessed portion 48 of the piston 10 are spring loaded latches 49, which snap into the latch hold 46 when the starting mechanism 45 moves it into the starting position. The latch release 47 is used to release the latches 49 during the starting process of the engine.

*Starting and operation of the engine of Figs. 1 and 2*

To start the engine, the fluid pressure in all the valve fluid springs is adjusted to the correct value from a compressed air storage tank (not shown), in a well-known manner. The check valve 18 is held open. The starting mechanism 45 forces the latch hold 46 to move so that the latches 49 will snap into it. Now the starting mechanism 45 forces the piston 10 to move to the extreme right thus expelling most of the air out of the cylinder 11. The carburetor 17 is choked, and a hydraulic, pneumatic or electric screw drive in the starting mechanism 45 pulls the piston 10 to the left into the position shown in Fig. 1. A fresh charge of air and gas is then sucked in through the carburetor 17 and the intake port 14. Now, the intake check valve 18 is released, and it closes the port 14. The separating valve 21 is opened by the fluid spring 23, and the fluid spring 32 forces the nozzle valve 33 to close the port 31. The starting mechanism 45 then pulls the latch release 47, releasing the latches 49 of the piston 10, and the starting assembly is pulled clear of the piston 10 until after the engine stops and the starting process is to be repeated.

The compressed air in the recoil cylinder 12 forces the piston 10 to accelerate to the right and to compress the air-and-gas mixture in the engine cylinder 11. The compressed gas mixture is forced to flow through the separating port 15 into the jet chamber 20; thus during the compression stoke the pressures in the cylinder 11 and the jet chamber 20 remain substantially the same. Part of the compressed air from the cylinder 11 bleeds through the port 34 into the cylinder 35 and thus helps to keep nozzle valve 33 closed.

As the piston 10 moves to the right, the gas pressure in the cylinder 11 increases and forces the piston 10 to decelerate. The area of the top of the valve 21 exceeds the area of the bottom by the area of the valve stem cross section. When the pressure in the cylinder 11 and the jet chamber 20 reaches a prescribed value, this gas pressure acts on the top of the valve 21 on an area corresponding to the cross sectional area of the valve stem 22, and, being greater than the force of the fluid spring 23, the valve 21 will then close the separating port 15 (see Fig. 2). The piston 23 will contact the switch 25 and thus energize the spark plugs 26 and 27 in the engine cylinder combustion chamber 28 and the jet combustion chamber 20. Thus, the gases will explode in the cylinder 11 and the jet chamber 20.

The rapid build-up of pressure in the engine cylinder 11 forces the piston 10 to stop its motion to the right and start accelerating to the left. When the explosion pressure in the jet chamber 20 increases sufficiently, the force on the shoulder 33ª forces the nozzle valve 33 open, and the jet gases exhaust through the nozzle 31 (Fig. 2). The gases exhausted through the jet nozzle 31 are expanded through the gas turbine 37 which powers the supercharger and ducted compressor 30.

When the hot gases which are trapped in the cylinder 11 during the expansion stroke expand to a pressure less than the supercharger pressure in the duct 16, the check valve 18 is forced open. Now a fresh charge of air and gas are sucked into the engine cylinder 11. Finally, the piston 10 moves to the extreme left (Fig. 1) and uncovers the exhaust ports 38; so the burnt gases in the cylinder 11 can be scavenged out the ports 38. The recoil air in the recoil cylinder 12 stops the leftward motion of the piston 10. By this time the hot gases in the jet chamber 20 have expanded sufficiently through the nozzle 31 so that the pressure against the shoulder 33ª is reduced to where the fluid spring 32 forces the nozzle valve 33 to close the port 31, and the fluid spring 23 forces the valve 21 open. The cycle is completed and will be repeated as the recoil air in the cylinder 12 will force the piston 10 to move to the right again.

The engine exhaust gases 40, the turbine exhaust gases 41, and the supercharged cooling air 42 are mixed in the joint accumulator 43. These gases may be used to give jet thrust directly, or they may be expanded through a gas turbine 43ª (Fig. 11) to give shaft power.

Figure 12:
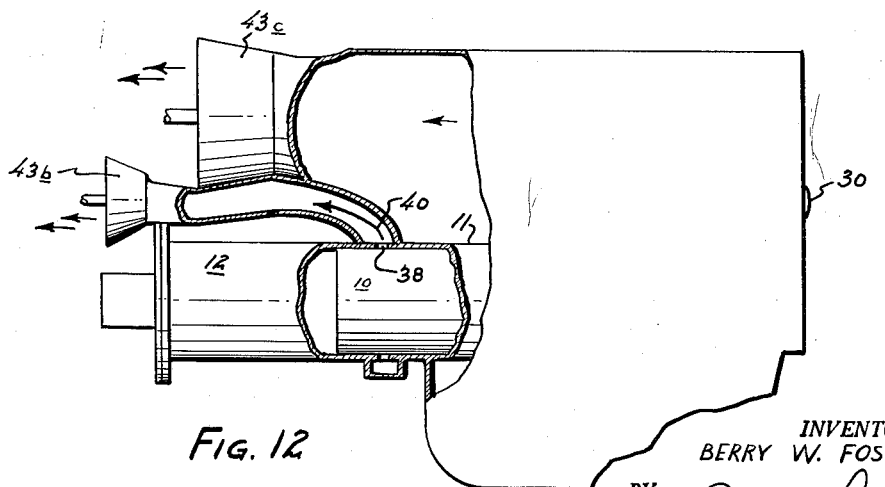
Fig. 12 is a similar view showing connection to two gas turbines.

Alternatively, the engine exhaust gases 40 may be used to drive a gas turbine 43ᵇ (Fig. 12) to give shaft power, while the exhaust gases 41 from the turbine 37 and the rotary compressor drive another gas turbine 43ᶜ.

*A double-acting free-piston gas generator (Figs. 3 and 4)*

Figs. 3 and 4 show a two-stroke double-acting compressed-gas generator combined with a gas turbine and rotary compressor.

An engine piston 101 reciprocates in an engine cylinder 102. There is an engine head 103 at the left end of engine cylinder 102 and another head 104 at its right end. Located in the heads 103 and 104 are respective intake ports 105 and 106 and respective separating ports 107 and 108. Poppet check valves 109 and 110 seat into the intake ports 105 and 106 respectively. When the valves 109 and 110 are open, the intake ports 105 and 106 conduct supercharged air, which has picked up a gas charge from respective carburetors 111, 112, into their respective cylinder ends.

The separating ports 107 and 108 lead from the cylinder 102 into respective jet chambers 113 and 114. Respective separating valves 115 and 116 are connected by respective stems 117 and 118 to pistons 119 and 120, which slide in respective cylinders 121 and 122. By way of example the cylinder 121 is shown as a fluid pressure cylinder, while a helical spring 122ª is shown in the cylinder 122. Of course, both would normally be the same type, but either type may be used.

When the pressure in the cylinder 121 produces a force on the piston 119 which is greater than the jet chamber 113 gas pressure force on the valve stem 117, the valve 115 will be forced open; and the valve 115 will be forced closed when the pressure in the jet chamber 113 exerts a force on the valve stem 117 which is greater than the fluid pressure force in the cylinder 121 on the piston 119.

When the valve 115 is forced closed, its piston 119 contacts a switch 123 which discharges spark plugs 125 and 127 respectively in the engine combustion chamber 103 and the jet combustion chamber 113. The separating valve 116 acts in the same manner as the separating valve 115, except that the force is supplied by the helical spring 122ª instead of using fluid pressure, and when closed, its piston 120 contacts a switch 124 to discharge spark plugs 126 and 128.

Leading from the jet chambers 113 and 114 are respective exhaust ports 131 and 132. A fluid spring 133 forces a valve 135 to close the jet exhaust port 131 when the pressure in the jet chamber 113 is at a low value. By way of example only, a helical spring 134 forces a valve 136 to close the jet exhaust port 132 when the pressure in jet chamber 114 is at a low value. Normally, both springs 133 and 134 would be fluid springs, or both would be helical springs.

A bleed passage 137 leads from the end 103 of the engine cylinder 102 to a gas pressure cylinder 139 and this pressure helps a piston 141 keep the valve 135 closed until the explosion pressure in the jet chamber 113 is increased enough to exert force on a shoulder 135ª that can open the nozzle port 131. Likewise, a bleed passage 138 leads from the end 104 of the engine cylinder 102 to a gas pressure cylinder 140 and this pressure helps a piston 142 keep the valve 136 closed until the explosion pressure in the jet chamber 114 acting on a shoulder 136ª is sufficient to open the nozzle port 132.

Halfway between the heads 103 and 104 are exhaust sleeve ports 150. When the piston 101 is at its extreme right or left position, the ports 150 are opened, so the burnt gases in the cylinder 102 can be scavenged out the exhaust port 150 into an engine exhaust 151.

The exhaust gases from the jet exhaust ports 131 and 132 are directed into gas turbines 153 and 154, respectively, which power rotary compressor 155 and 156. Part of the compressor discharge air 157 is used to supercharge and scavenge the engine cylinder 102. The engine exhaust gases 158, the turbine exhaust gases 159, and the compressor discharge air 160 may be used separately, if desired, or they may be mixed in a joint accumulator and then used as desired. For example, they may be used for jet thrust directly or they may be expanded through a gas turbine to give shaft power.

The free piston compressor of Figs. 3 and 4 may be started by the methods explained in Patent No. 2,807,136 and in the succeeding explanation of Figs. 6–10.

The operation of this free piston compressed gas generator is substantially the same as that of the right end of the design shown by Figs. 1 and 2. However, this engine is double acting and the compression, separation, and explosion takes place alternately at each end of the engine cylinder.

*A twin-free-piston engine with recoil springs (Figs. 6–10)*

A two-stroke single-acting compressed-gas generator with a recoil spring is illustrated in Figs. 6 to 10, which show a form of the invention using two free pistons and a set of electrical connections controlled by pneumatic switches.

In a cylinder 200, two free pistons 201 and 202 reciprocate, 180 degrees out of phase so that they always go in opposite directions. When the pistons 201, 202 move toward each other (from their Fig. 10 position to their Fig. 6 position) air is compressed between them in a space 203. When the pistons 201, 202 move apart toward the cylinder end walls 204, 205 (Figs. 7 to 9), air is compressed at the outer ends of the cylinder 200 in spaces 204a and 205a. This compressed air in the chambers 204a, 205a acts as a recoil spring and forces the pistons 201, 202 to go back together again. A mechanical recoil spring could be used in place of this pneumatic recoil spring.

Fresh air may be supplied to the space 203 by a supercharger 206 through a port 207 at the center of the cylinder 200. A check valve 208 keeps the port 207 closed except when the pressure in chamber 203 is lower than the pressure in the supercharger 206. The air that passes into the supercharger 206 may carry gas vapor or other fuel from a carburetor 209.

A port 210 at the center of the chamber 203 opens into a compressor combustion chamber 211. The chamber 211 may be joined to or isolated from a jet combustion chamber 212 by a pneumatically controlled valve 213 that opens and closes a port 214.

The valve 213 may be connected to a piston 215 that slides in a cylinder 216 that is joined to a compressed gas reservoir 217. The pressure in the reservoir 217 and cylinder 216 urges the piston 215 so that the valve 213 is normally held open. When the force on the valve 213 by the pressure in the chambers 211 and 212 is greater than that from the pressure in the cylinder 216, the valve 213 will close the port 214. This occurs when the cylinders 201, 202 move toward each other to about the position shown in Fig. 7.

When the valve 213 is closed, the piston 215 will close a switch 218, completing a circuit through battery or other E.M.F. 250, lines 251, 252, and 253, and ground, for two spark plugs 220, 221, which respectively ignite the fuel in the chambers 211 and 212. The switch 218 may also complete a circuit from battery 250, lines 251, 252, and 254 through a relay 219 for shutting off a pair of starting compressors 222 and 223 and for operating two solenoid valves 224 and 225, but this part of the circuit works only during the starting cycle of the engine, and will be explained when that is discussed.

An exhaust valve 226 opens and closes a nozzle port 227 for the jet combustion chamber 212, whence the external-power gases emanate. The valve 226 is normally held closed by a biasing spring 228 and an associated toggle mechanism 229. When the pressure load on the valve 226 from the gas in the chamber 212 exceeds the sum of the pressure of the spring 228 and the load of the toggle 229, the valve 226 is forced open.

The spring 228 may be mounted around a rod 230 that has a cam or detent 231 thereon. When the valve 226 is forced open, the cam 231 may close a switch 232 that energizes a solenoid 233, from E.M.F. 255 and lines 256 and 257. The solenoid 233 will then hold the valve 226 open until it is de-energized. The solenoid 233 remains energized until the pressure in the recoil chamber 205a exceeds a predetermined value. Then a pressure switch 234 breaks the connection between lines 258 and 259 that connect the solenoid 233 to the other side of the E.M.F. 255, to de-energize the solenoid 233, so that the spring 228 can close the valve 226. Although the pressure switch 234 is shown at the left end of the cylinder 200, it could be located at the other end.

The starting apparatus for the engine includes a low pressure auxiliary compressor 222 (which may be operated by an electric motor), that forces air through the carburetor 209, through the supercharger 206 and into the central chamber 203. It also includes an auxiliary high-pressure compressor 223 (which also may be operated by an electric motor) that forces air through a port 235 into a channel 236. The channel 236 leads to both end chambers 204a and 205a through ports 237 and 238. Air from the second auxiliary compressor 223 thus forces the pistons 201, 202 toward each other against the fuel-laden air supplied from the first auxiliary compressor 222. The power for the compressors 222, 223 may be supplied by electric circuits that include a pair of relay switches 242, 243, one of which is associated with each compressor 222, 223. The relay switches 242, 243 are turned on manually to start the compressor motors. At the same time a trigger switch 260, 261 is cocked in each relay switch. When the switch 218 is closed, its circuit energizes the relays 242, 243 that trip the trigger switches and turn off the relay switches 242, 243 until the engine is started again. The circuit operates through the time-delay relay 219 by lines 262 and 263, E.M.F. 264, and line 265 to the relays 242 and 243. The relay circuits include respective switches 260, 261, lines 266, 267 and E.M.F.'s 268, 269.

Figure 6:
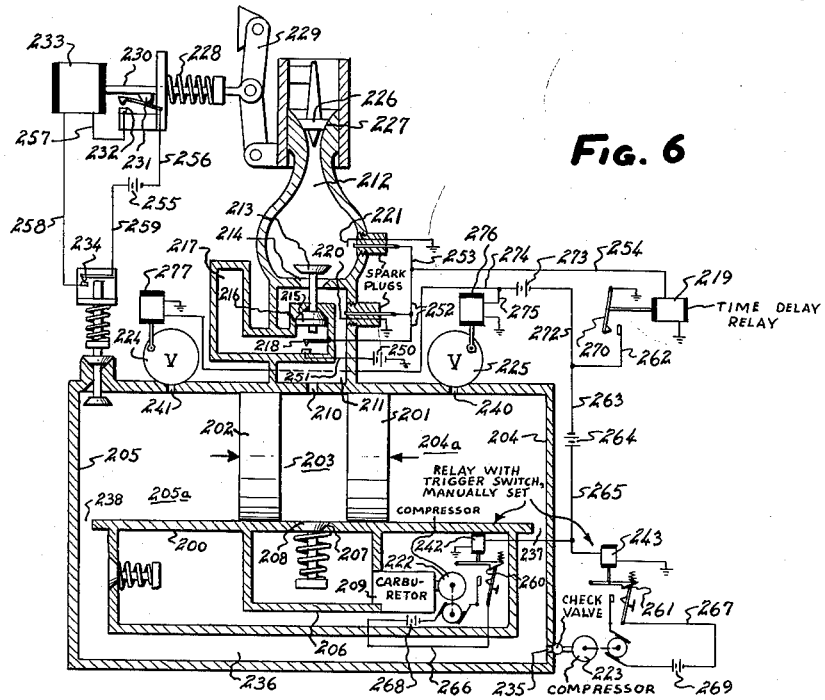
Fig. 6 is a diagrammatic view of a modified form of a jet-type engine embodying the principles of this invention, this form of the invention showing an engine with a two-stroke single-acting compressed-gas generator. Two free pistons are shown in starting position.
Figure 7:
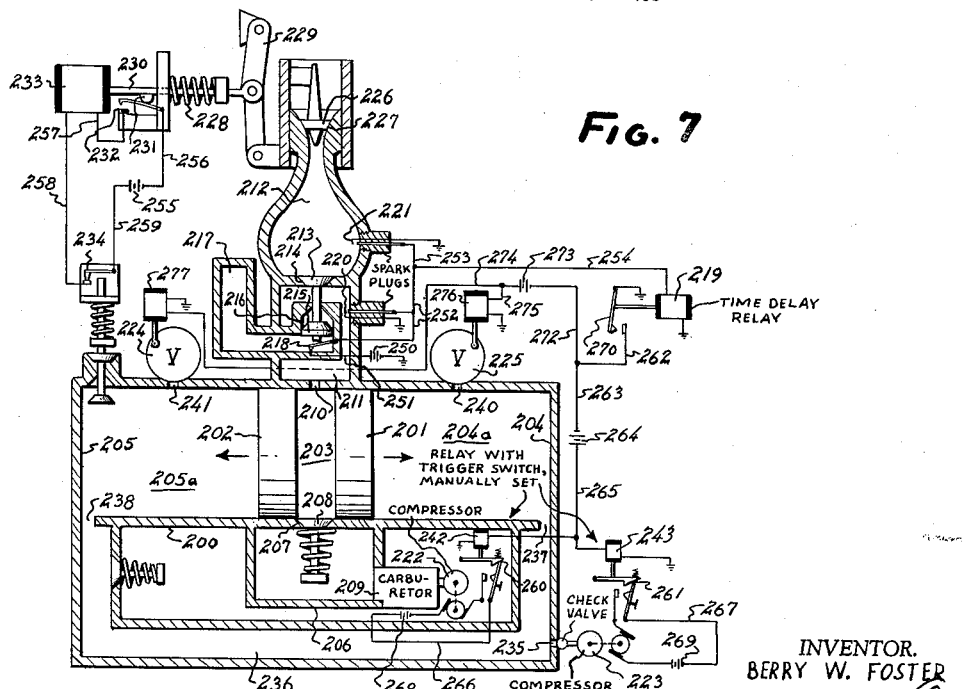
Fig. 7 is a view similar to Fig. 6, showing the pistons beginning to move outwardly away from each other.
Figure 8:
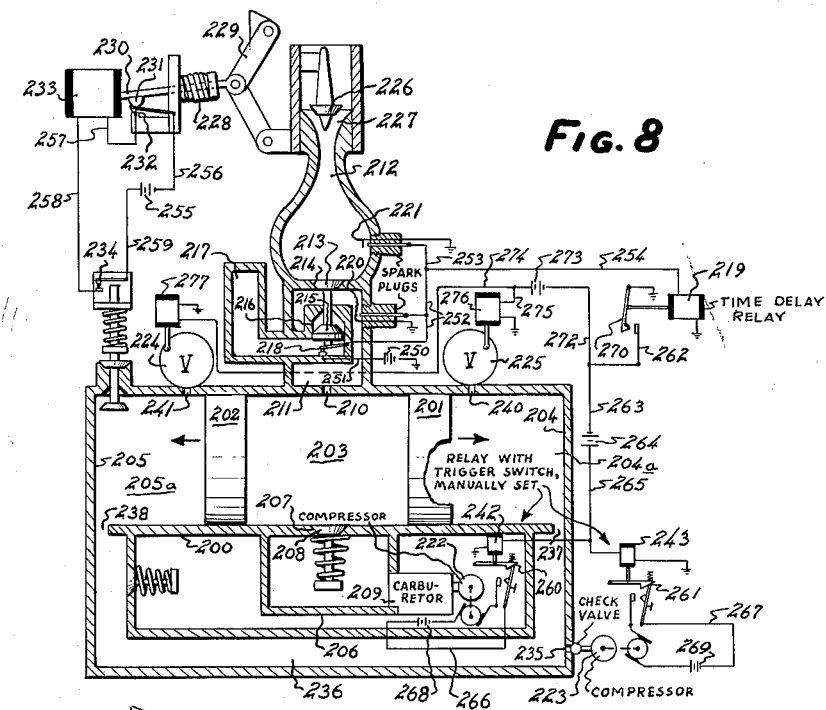
Fig. 8 is a view similar to Fig. 7 showing the pistons moved further outwardly.
Figure 9:
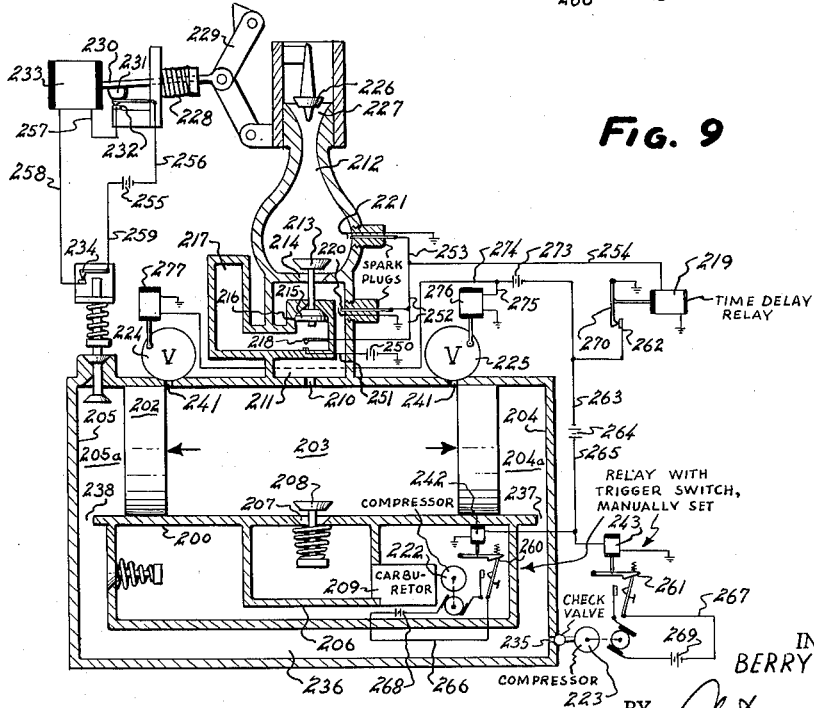
Fig. 9 is a view similar to Fig. 7 showing the pistons moved still further outwardly.
Figure 10:
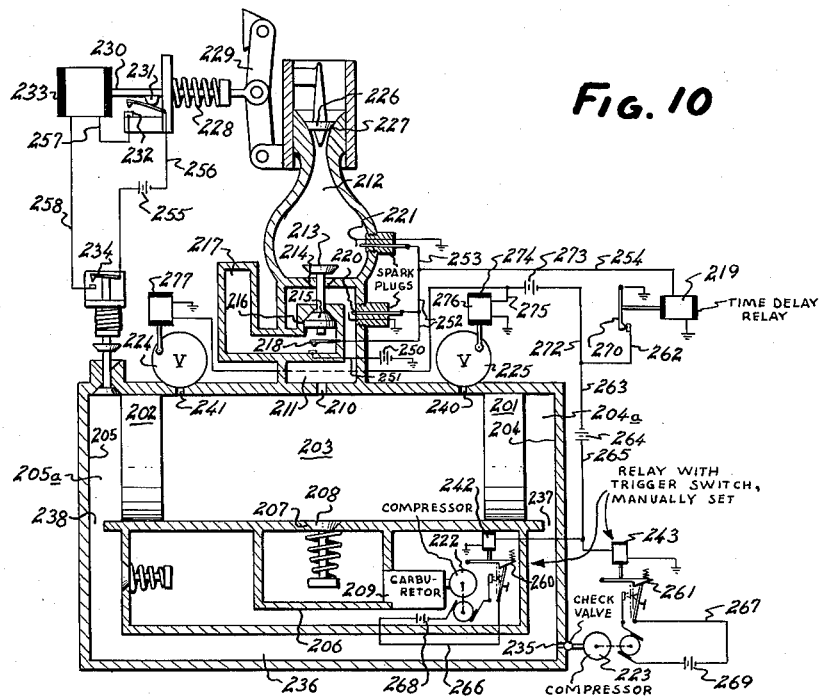
Fig. 10 is a view similar to Fig. 7 showing the pistons at approximately the limit of their outer stroke and beginning to move inwardly toward each other.

Electrically-controlled valves 224 and 225 in the chambers 203, 204a, and 205a open exhaust ports 240, 241 during the operating cycle to permit the escape of stale gases. This is done by a time-delay relay 219 that is started when the switch 218 is closed. The relay 219 permits the valves 224, 225 to remain in open position for a length of time equivalent to one-fourth of the period of the pistons 201, 202. (Ref. Figs. 9 and 10.) Then the relay 219 opens a switch 270 that causes the valves 224, 225 to close the ports 240, 241. (Ref. Figs. 6 to 8.) The switch 270 acts through lines 262, 272, E.M.F. 273, lines 274 and 275 and solenoids 276 and 277.

To start the engine, the carburetor 209 is choked and the trigger switches 260 and 261 of the relay switches 242 and 219 are cocked so that the electric motor turns the first starting low-pressure compressor 222. The compressor 222 then forces air through the carburetor 209 and into the chamber 203 through the port 207. At this time the solenoid 233 is de-energized; so the spring 228 will hold the valve 226 closed, so that some pressure builds up in the chambers 203, 211, and 212.

When enough pressure has built up (this may be checked by means of a pressure gauge connected to the chamber 203), the second auxiliary high-pressure compressor 223 is turned on, the relay switch 243 being cocked. The check valve for the port 235 is opened, and compressed air flows into the channel 236 and out through the ports 237 and 238 into the chambers 204a and 205a. This high pressure in the chambers 204a and 205a forces the pistons 201 and 202 toward each other compressing between them the air and the combustible gases in chambers 203, 211, and 212, to the position shown in Fig. 6.

When the force on the valve 213 due to the pressure in chambers 203, 211, and 212 exceeds the force on the valve 213 due to the pressure in the cylinder 216, the valve 213 will close the port 214, and the piston 215 will close the switch 218 (Fig. 7). The circuit of the switch 218 will then energize solenoids that trip the trigger switch in the relay switch 219. The relay circuit of the switch 219 will then trip the trigger switches in the relay switches 242, 243, turning off the starting compressors 222 and 223. The pressure in the channel 236 will close the check valve in the port 235. The circuit controlled by the switch 218 will also open the electrically controlled valves 224 and 225, which open the exhaust ports 240 and 241.

The switch 218 energizes the spark plugs 220 and 221, and they ignite the combustible gases in the chambers 211 and 212. The heated gases in the chambers 203 and 211 will force the pistons 202 and 201 to move out away from each other. For the first few cycles the compressed gas in the chambers 204a and 205a will flow out the exhaust ports 241 and 242.

The heated gases in the jet chamber 212 gradually increase in pressure after each stroke until the force on the exhaust valve 226 is greater than the combined force of the biased spring 228 and the toggle 229; then the valve 226 will be forced open (Fig. 8). The external power gas will then exhaust through the nozzle 227. The switch 232, closed by the cam 231, will energize the solenoid 233, so that the valve 226 is held open.

When the pistons 201, 202 reach the Fig. 9 position, the force on the valve 213 due to the pressure in the chambers 211 and 212 will be less than that due to the pressure in the cylinder 216; so the piston 215 will force the valve 213 open. At about the same time the supercharger 206 will force the check valve 208 open, and scavenging air will force the old gases to exhaust through the ports 210, 240, 241, 214, and 227. Also, combustible vapor will be sucked in through carburetor 209 with a fresh charge of air.

The engine is now ready to run on its own power. The starting compressors 222 and 223 have been turned off, until the engine is to be started again. The port 235 is locked closed until the engine is to be started again.

Now whenever the piston 202 reaches the Fig. 10 position, the pressure in the recoil chamber 205a will force the pressure switch 234 open and de-energize the solenoid 233. Then the spring 228 will force the valve 226 closed again. The compressed air in the chambers 204a, 205a, and the passage 236, then serves as a recoil spring which will force the pistons 201, 202 together, compressing a fresh charge of air and combustible gases in the chambers 203, 211, and 212.

On each compression stroke of the pistons 201, 202 the valve 213 remains open (Fig. 6) until the force on it due to the pressure in the chambers 211 and 212 becomes greater than that due to the pressure in the cylinder 216; then the valve 213 is forced closed (Fig. 7). The piston 215 then closes the switch 218, and the spark plugs 220, 221 ignite the fuel in the chambers 211, 212. The explosion of the fuel in the chamber 211 also heats the gases in the chamber 203, and the pistons 201, 202 are forced outwardly, compressing the gases in the chambers 204a and 205a.

At the same time, the heat of explosion in the jet chamber 212 raises the pressure in this chamber until it exceeds the biasing force on the valve 226 and opens it (Fig. 8). The heated power gases in the chamber 212 will exhaust through the jet nozzle 227, the solenoid 233 holding the valve 226 open.

The cycle has been completed, and it will repeat itself indefinitely, the compressed air in the chambers 204a, 205a causing recoil. Fresh gas is then drawn into the chambers 203 and 212, compressed, separated into two portions and the two portions are separately exploded. The power portion flows through the jet nozzle 227, and the internal power portion in the chambers 203, 211 runs the compressor with the help of the recoil spring.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An engine having its own means for compressing gas and including in combination at least one compressor cylinder; piston means reciprocable therein; at least one generally enclosed chamber means adjacent said cylinder and connected therewith by a port, said chamber means having outlet means; means normally closing said outlet means and opening said outlet means at predetermined pressure conditions in said chamber; valve means for closing said port as said piston approaches said port, so as to isolate the gas compressed in the enclosed chamber from the portion of the gas compressed in said cylinder; fluid-pressure-actuated means for opening said valve means when the pressure of the gas being compressed in said cylinder and said chamber is below a predetermined value; fluid-pressure-actuated means for forcing said valve means closed when the pressure of such gas exceeds said predetermined value; means for charging fuel into the gas compressed in said cylinder and said chamber; and means for exploding the said fuel, the gases from said enclosed chamber being used to supply external power while the expanded gases in the cylinder are used to drive the piston, said cylinder gases doing no external work.

2. The engine of claim 1 wherein each cylinder has two pistons reciprocatable therein toward and away from each other, each cylinder having one said chamber means located adjacent to and communicating by a said port with the center of said cylinder.

3. An engine of the type described, having its own means for compressing air and including in combination at least one compressor cylinder; piston means reciprocable therein; at least one generally enclosed chamber means adjacent said cylinder and connected therewith by a port, said chamber means having outlet means; means normally closing said outlet means and opening said outlet means at predetermined pressure conditions in said chamber; valve means for opening and closing said port, the closing of said port isolating the air compressed in the enclosed chamber from the portion of the air compressed in said cylinder; means actuated by fluid pressure for opening and closing said valve means, so that when the pressure of the air being compressed in said cylinder and said chamber is below said predetermined value, said valve means is open and when the pressure of such air exceeds said predetermined value, said valve means is closed; means for putting fuel into said air in both said cylinder and said chamber; and means for exploding said fuel while said enclosed chamber is closed, the gases from said enclosed chamber being used to supply external power while the expanded gases in the cylinder are used to drive the piston, said cylinder gases doing no external work.

4. An engine of the type described, having its own means for compressing air and including in combination at least one compressor cylinder; piston means reciprocable therein; at least one generally enclosed chamber means adjacent said cylinder and connected therewith by a port, said chamber means having outlet means; means normally closing said outlet means and opening said outlet means at predetermined pressure conditions in said chamber; valve means actuated by the pressure in said chamber means for closing said port as said piston approaches said port, so as to isolate the air compressed thereby in said enclosed chamber from the portion of the air compressed in said cylinder; means for mixing fuel into said air so that the air in both said cylinder and said chamber contains said fuel; and means including an electric circuit operated upon the closing of said valve means, for exploding the said fuel, the gases from said enclosed chamber being used to supply external power while the expanded gases in the cylinder are used to drive the piston, said cylinder gases doing no external work.

5. The engine of claim 4 having a pair of said pistons in said cylinder for compressing air alternately toward each other and toward the two ends of the cylinder, said chamber means being adjacent the center of said cylinder, the fuel being mixed by said mixing means into the air between said pistons and exploded there as well as in said chamber means to drive said pistons apart, while the recoil from the gas compressed at the ends of the cylinders is used to move the pistons toward each other.

6. The engine of claim 5 in which there is a channel connecting the opposite ends of said compressor cylinder for equalizing the recoil pressure at the two ends of said cylinder.

7. An engine having its own means for compressing gas and including in combination: at least one compressor cylinder; piston means reciprocable therein; means providing at least one generally enclosed chamber adjacent to one end of said cylinder and connected therewith by a connecting port, said chamber also having an outlet port; valve means for closing said connecting port so as to isolate the gas compressed in said chamber from the gas compressed in said cylinder; fluid-pressure actuated means for controlling said valve means at a predetermined value, so that when the pressure of the gas being compressed in said cylinder and said chamber is below said predetermined value, said valve means is forced open by said fluid-pressure-actuated means, and when the pressure of such gas exceeds said predetermined value as said piston approaches said connecting port, said valve means is forced closed; means operative when said piston is at the other end of said engine cylinder for returning said piston toward said one end of said cylinder; means for sending fuel and air into said one end and into said enclosed chamber; means for exploding said fuel and air, the expanded heated gases in the cylinder being used to drive the piston to said other end of said cylinder; closure means normally closing said outlet port; and means to move said closure means and open said outlet port after the pressure produced by explosion of fuel and air in said chamber reaches a predetermined value, the exploded chamber gases then being exhausted from said chamber.

8. An engine including in combination: at least one cylinder having an inlet port and an exhaust port and piston means reciprocable therein; first fluid-pressure-operated means for opening said inlet port at a predetermined low pressure in said cylinder and for closing said inlet port at a predetermined higher pressure in said cylinder; means providing at least one generally enclosed chamber adjacent one end of said cylinder and connected therewith by a connecting port, said chamber also having an outlet port; second fluid-pressure-operated means for closing said connecting port at a predetermined pressure to isolate the gas therein from that of said cylinder and opening it below that pressure; third fluid-pressure-operated means for closing said outlet port at a predetermined pressure and opening it at a predetermined higher pressure in said chamber; piston return means at the other end of said engine cylinder for returning said piston toward said one end of said cylinder; means for exploding the compressed gas in each of said cylinder and said chamber, the expanded heated gases in the cylinder being used to drive the piston to said other end of said cylinder, said outlet port being opened by said third fluid-pressure-operated means after the pressure produced by explosion in said chamber reaches a predetermined value, so that exploded chamber gases can exhaust from said chamber.

9. The engine of claim 8 wherein said piston return means comprises a recoil cylinder at said other end of said cylinder wherein kinetic energy from said piston is stored during the expansion stroke thereof and returned during the compression stroke.

10. The engine of claim 8 wherein said piston return means comprises a structure at said other end of the cylinder generally symmetric to that at said one end of the cylinder, including another said chamber and connecting port and outlet port also operated by fluid pressure actuated means, so that the piston is double acting, with compression, separation, explosion, and expansion alternately at both ends of said cylinder.

11. The engine of claim 8 wherein said second fluid-pressure-operated means comprises a valve adapted to open and close said connecting port, a stem connected thereto, a piston on the opposite end of said stem from said valve, and a cylinder in which said piston moves.

12. The engine of claim 11 wherein said piston on said valve stem actuates said means for exploding, upon closure of said valve in said connecting port.

13. The engine of claim 8 wherein said third fluid-pressure-operated means includes a closure valve for said outlet port, a stem for said valve, a cylinder and a piston on said stem movable in said last named cylinder.

14. The engine of claim 13 wherein said third fluid-pressure-operated means also includes a second cylinder, a second piston on said stem movable in said second cylinder, and a passage leading from the engine cylinder into said second cylinder on the side of said piston where increased pressure on said second piston tends to hold said valve closed.

15. An engine-compressor, including in combination: at least one cylinder having an inlet port and an exhaust port; piston means reciprocable therein; a spring-biased valve for opening said inlet port at a predetermined low pressure in said cylinder to admit a charge thereto and for closing said inlet port at a predetermined higher pressure in said cylinder; means providing at least one generally enclosed chamber adjacent one end of said cylinder and connected therewith by a connecting port, said chamber also having an outlet port; a spring-biased valve for closing said connecting port to isolate the gas therein from that in said cylinder, at a predetermined pressure and opening it below that pressure; valve means for opening and closing said exhaust port; a spring-biased outlet valve for closing said outlet port at a predetermined pressure in said chamber and opening it at a predetermined higher pressure in said chamber; means at the other end of said engine cylinder for returning said piston toward said one end of said cylinder; means for exploding the compressed said charge in each of said cylinder and said chamber, the expanded heated gases in the cylinder being used to drive the piston to said other end of said cylinder, said outlet valve being opened after the pressure produced by the explosion in said chamber reaches a predetermined value, so that external power gases can exhaust from said chamber.

16. The engine-compressor of claim 15 wherein there are: a turbine adjacent said outlet port and driven by the external power gases flowing therethrough, and a rotary compressor driven by said turbine and connected to said inlet port to supply air therethrough to said cylinder.

17. The engine compressor of claim 15 wherein the spring-biased valves therein are spring-biased by fluid springs.

18. The engine-compressor of claim 15 wherein the outlet valve has a stem with a piston thereon, a fluid cylinder in which said piston slides, and a bleed passage connecting the fluid cylinder to the nearby end of the engine cylinder, the pressure therefrom helping to hold said outlet valve closed until the explosion pressure in said chamber reaches a predetermined value.

19. The engine-compressor of claim 15 wherein the exhaust port from the cylinder is a sleeve port covered and uncovered by said piston which serves as said valve means for opening and closing said exhaust port, and wherein said inlet port is in a head at its end of the cylinder, whereby, when the heated gases in the cylinder expand, they flow toward the center of the cylinder and when by this expansion the pressure in the cylinder is at a predetermined level, the valve closing said inlet port opens, admitting a fresh charge that flows in the same direction to scavenge the exhaust gases out through said sleeve port and freshly charge the cylinder.

20. An engine-compressor, including in combination: at least one cylinder, having an inlet port and a sleeve-exhaust port centrally located in said cylinder; piston means reciprocable in said cylinder; pressure-biased poppet valve means for opening said inlet port at a predetermined low pressure in said cylinder to place a charge therein and for closing said inlet port at a predetermined higher pressure in said cylinder; means providing at least one generally enclosed chamber adjacent one end of said cylinder and connected therewith by a connecting port, said chamber also having an outlet port; valve means for closing said connecting port to isolate the gas therein from that in said cylinder; fluid-pressure-actuated means for closing said valve means at a predetermined pressure and opening it below that pressure; an exhaust valve for closing said outlet port; fluid-pressure-operated means for closing said exhaust valve at a predetermined pressure in said cylinder and opening it at a predetermined higher pressure in said chamber; means at the other end of said engine cylinder for returning said piston toward said one end of said cylinder; means for exploding the compressed said charge in each of said cylinder and said chamber, the expanded heated gases in the cylinder being used to drive the piston to said other end of said cylinder, said exhaust valve being opened by its said fluid-pressure-operated means after the pressure produced by the explosion in said chamber reaches a predetermined value, so that external power gases can exhaust from said chamber; a housing adjacent said outlet port into which said outlet port opens; a turbine in said housing driven by said external power gases, said housing having an exhaust passage; a rotary compressor driven by said turbine and connected to said inlet port to supply gas therethrough to said cylinder and to an outlet duct; and a manifold connected to said cylinder exhaust port, said turbine housing exhaust passage, and said duct, routing the excess gas from all three through a single conduit.

21. The engine-compressor of claim 20 wherein the exhaust gases from the engine cylinder and the turbine and the excess gases from the rotary compressor are mixed in a joint accumulator to provide thrust therefrom.

22. The engine-compressor of claim 21 wherein the gases from the joint accumulator are exhausted directly and provide jet thrust.

23. The engine-compressor of claim 21 wherein the gases from the joint accumulator drive a gas turbine to provide shaft power.

24. The engine-compressor of claim 16 wherein the exhaust gases from the engine cylinder and the exhaust gases from the turbine and the rotary compressor drive respective gas turbines to give shaft power.

References Cited in the file of this patent

UNITED STATES PATENTS

| | | |
|---|---|---|
| 1,035,454 | Lewis | Aug. 13, 1912 |
| 2,512,254 | Mallory | June 20, 1950 |
| 2,583,651 | Horning | Jan. 29, 1952 |
| 2,807,136 | Foster | Sept. 24, 1957 |